H. HENDERSON.
SHOCK LOADER.
APPLICATION FILED MAR. 19, 1910.

1,040,539.

Patented Oct. 8, 1912.
5 SHEETS—SHEET 4.

WITNESSES
A. M. Walstrom
J. A. Byrnes.

INVENTOR
HENRY HENDERSON
BY Paul & Paul
ATTORNEYS

H. HENDERSON.
SHOCK LOADER.
APPLICATION FILED MAR. 19, 1910.

1,040,539.

Patented Oct. 8, 1912.
5 SHEETS—SHEET 5.

WITNESSES

INVENTOR
HENRY HENDERSON
BY Paul & Paul
ATTORNEYS 1,040,539.

UNITED STATES PATENT OFFICE.

HENRY HENDERSON, OF HALSTAD, MINNESOTA.

SHOCK-LOADER.

Specification of Letters Patent.   Patented Oct. 8, 1912.

Application filed March 19, 1910.   Serial No. 550,371.

*To all whom it may concern:*

Be it known that I, HENRY HENDERSON, of Halstad, Norman county, Minnesota, have invented certain new and useful Improvements in Shock-Loaders, of which the following is a specification.

The object of my invention is to provide a machine by means of which shocks or bundles of grain can be easily and quickly picked up from the ground and delivered at any desired point in the gathering receptacle or rack.

A further object is to provide a machine capable of use also for handling loose hay or grain.

A further object is to provide a receptacle which can be easily and quickly adapted for use as a manure spreader.

Other objects of the invention will appear from the following detailed description.

The invention consists generally in a wheeled frame, a rack or receptacle thereon and a raking or elevating device operating within said rack and capable of angular adjustment with respect thereto.

Further the invention consists in means to prevent the load from sliding out of the rack while it is being filled.

Further the invention consists in a spring mechanism arranged to counter balance the weight of the forward portion of the rack and prevent the gathering fingers from digging into the soil.

Further the invention consists in various constructions and combinations, all as hereinafter described and particularly pointed out in the claims.

Figure 1:
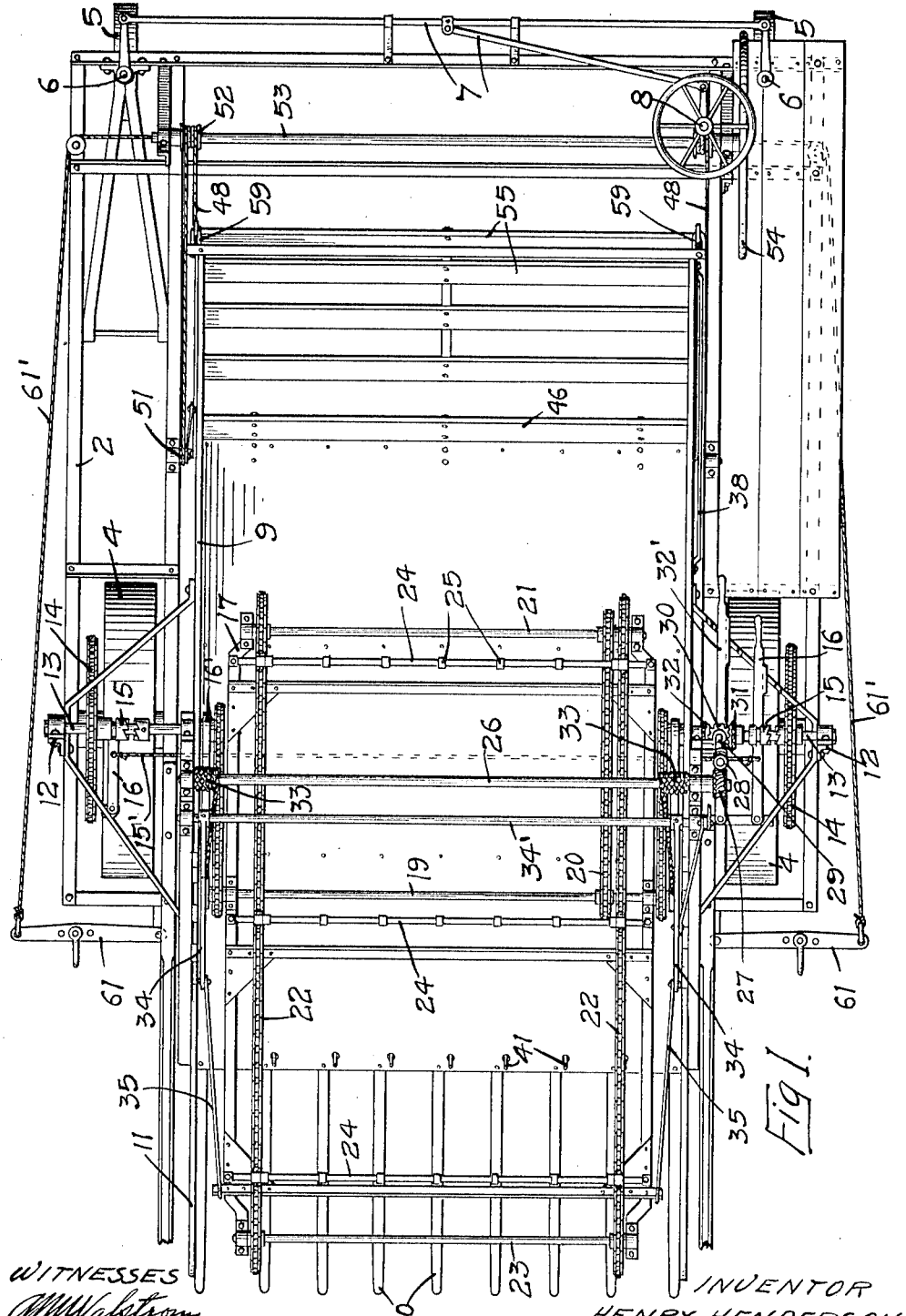
Figure 2:
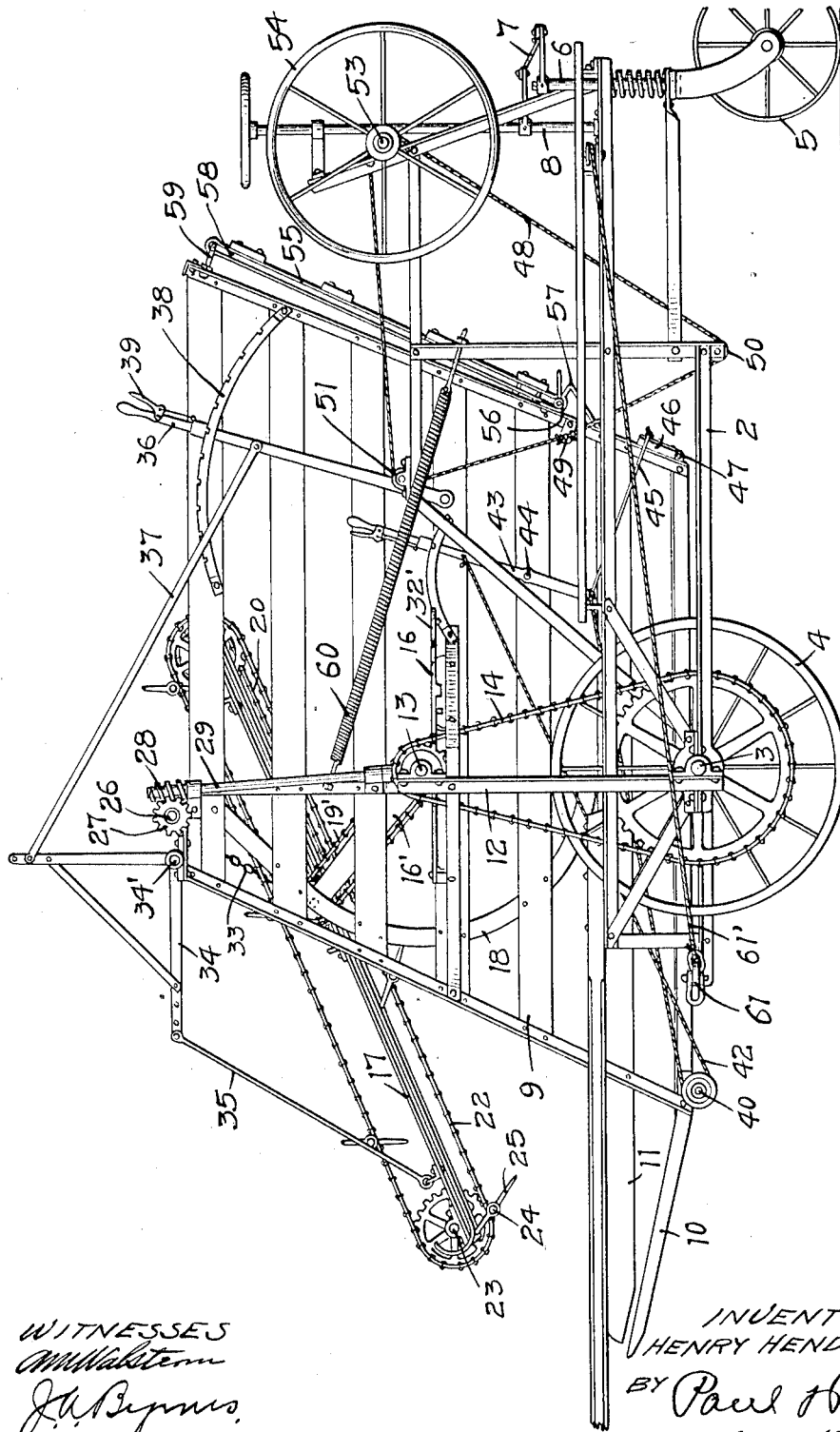
Figure 3:
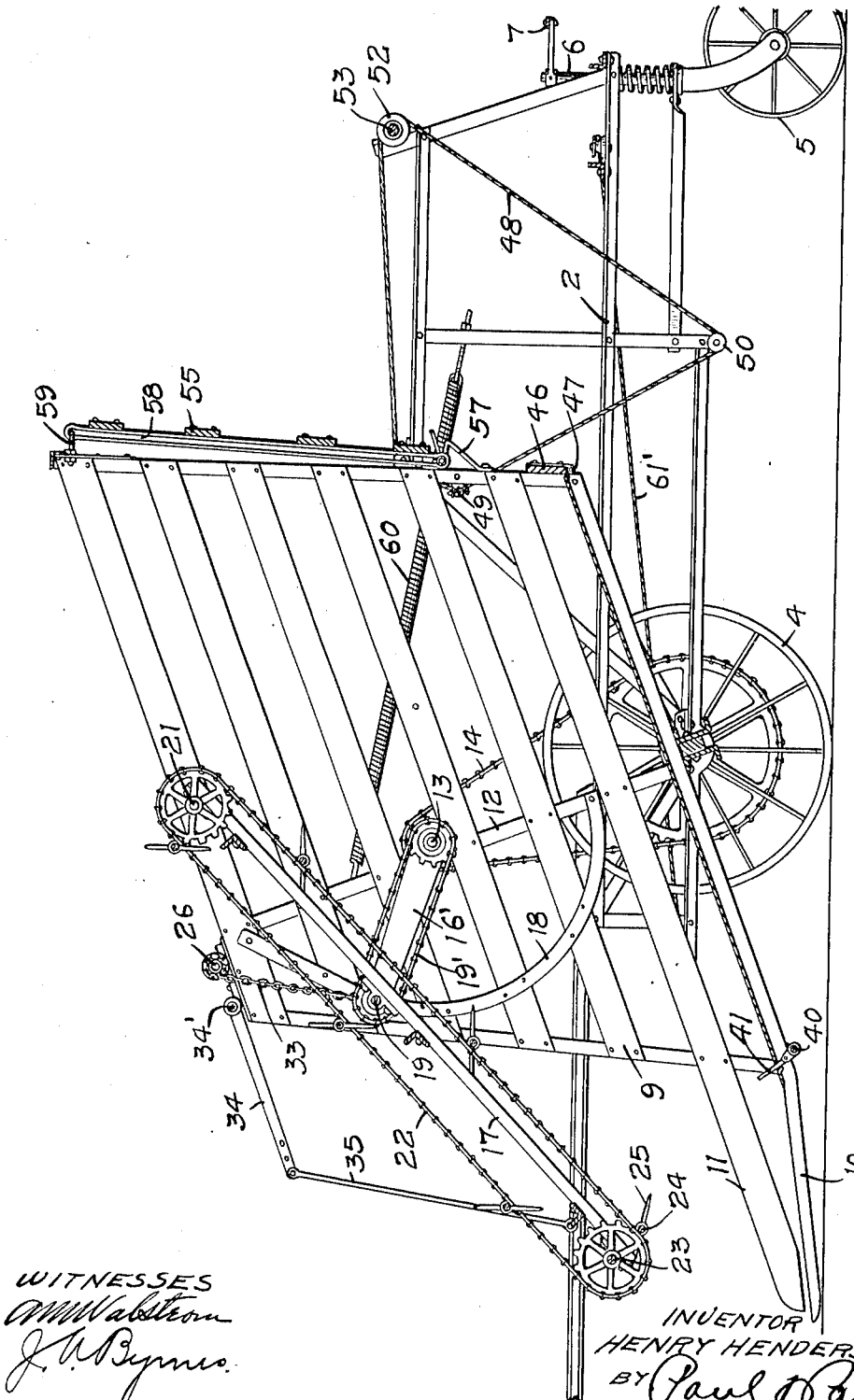
Figure 4:
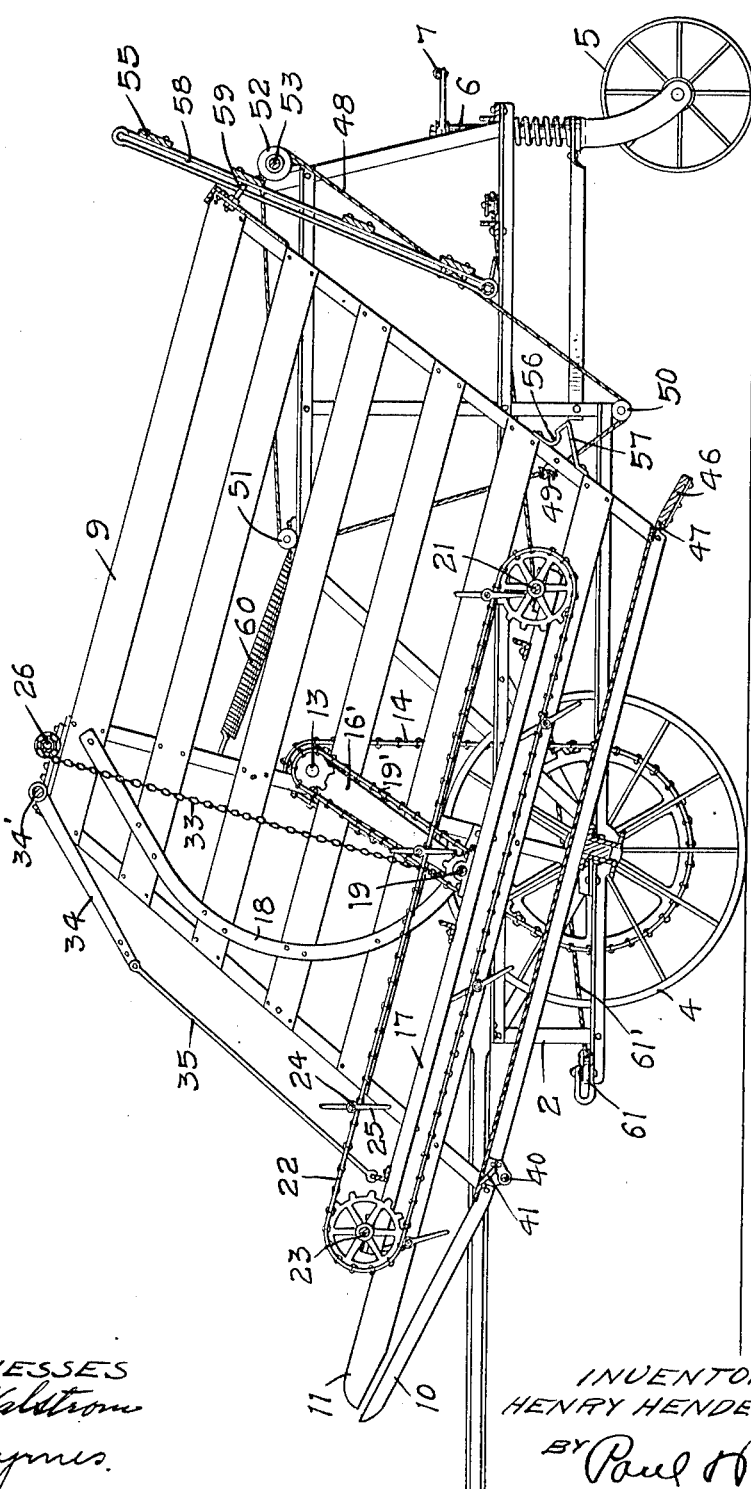
Figure 5:
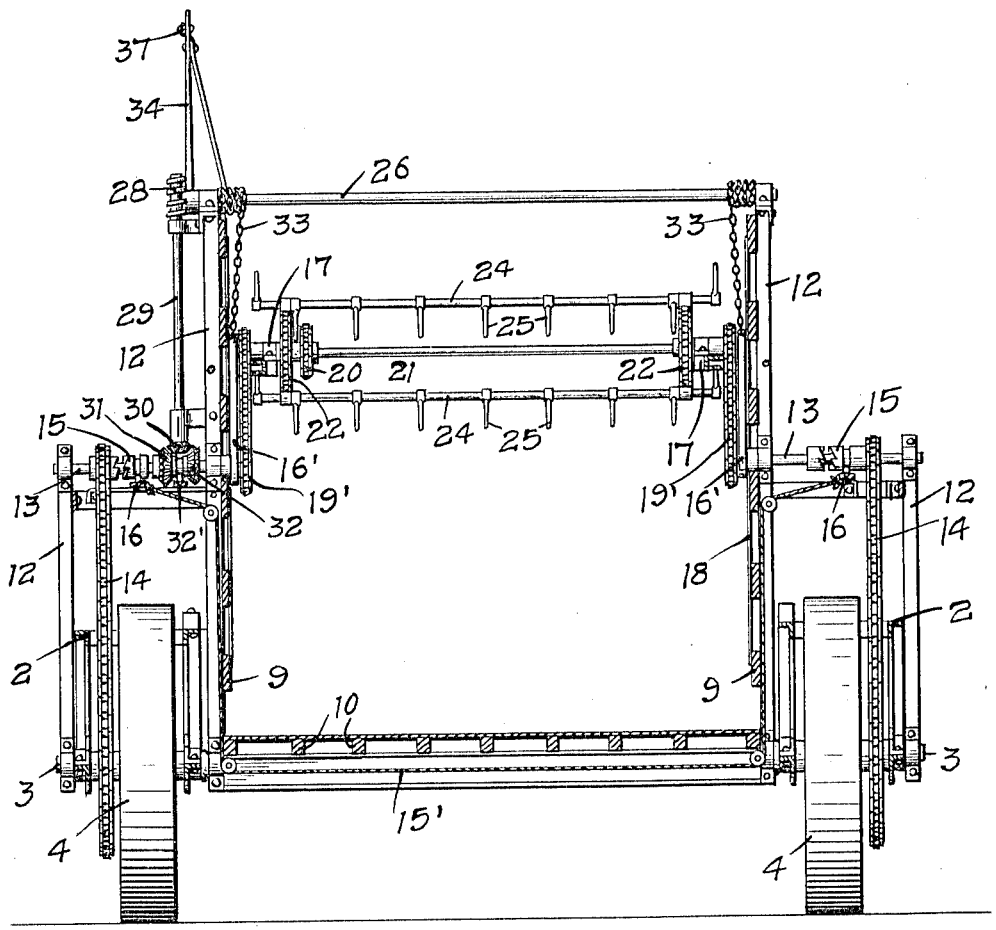

In the accompanying drawings forming part of this specification, Figure 1 is a plan view of a loading apparatus embodying my invention, Fig. 2 is a side elevation showing the apparatus in its normal position ready for use, Fig. 3 is a similar view illustrating the receptacle tilted in position to gather up the bundles of grain or loose hay with the elevating device adjusted for feeding the material backwardly into the receptacle. Fig. 4 is a side elevation illustrating the machine adapted for use as a manure spreader. Fig. 5 is a vertical, sectional view of the machine, illustrating the arrangement of the operating parts.

In the drawing, 2 represents a skeleton frame of suitable material having an axle 3, carrying wheels 4 and caster guiding wheels 5. These guiding wheels are of ordinary construction, mounted on posts 6 and having link connections 7 with a steering post 8 that is mounted in bearings at the rear of the machine. Upon the axle a receptacle or rack 9 is secured, the axle tilting in its bearings in the wheels to allow the rack to be oscillated forward or backward to adapt it for receiving material or discharging it therefrom. The lower rails of this rack have a series of forwardly and upwardly turned fingers 10, which are adapted to rest upon the ground and gather up the bundles or shocks of loose hay and direct them into the receptacle, guard rails 11 being provided on each side of said fingers. Upright bars 12 are provided on each side of the rack and adapted to tilt therewith and shafts 13 are journaled in the sides of the frames and driven through belts 14 from the carrying wheels 4. These shafts have clutches 15 thereon controlled by levers 16, said clutches being actuated by the movement of the levers to render the shafts 13 operative or inoperative. A cable 15' connects the lever 16 on one side of the machine with the corresponding clutch lever on the other side of the machine so that the clutches 15 will be operated simultaneously. Upon these shafts arms 16' are secured, carrying a rake frame 17, said arms swinging between guard plates 18 secured to the sides of the rack and capable of movement for the purpose of raising or lowering said rake frame within the rack to adapt it for handling various kinds of material and when the rack is empty or partially filled. A shaft 19 is mounted in the rake frame and has a belt 20 connecting it with a similar shaft 21 around which belts 22 pass to a shaft 23 at the opposite end of the rake frame. The shaft 19 is driven through the belt 19' from the shaft 13. At intervals upon the belts 22 shafts 24 are mounted, each carrying a series of rake fingers 25 that are adapted to engage the bundles or loose grain or hay and feed them backwardly into the rack, the rake frame being adjusted at the desired elevation from the bottom of the rack by the vertical oscillation of the arms 16'.

For the purpose of raising or lowering the rake frame, I provide a transverse shaft 26 on the upper portion of the rack with a gear 27 meshing with a worm 28 provided on the upper end of a shaft 29 which is journaled in the bar 12 and has a gear 30 at its lower end. Bevel gears 31 and 32 are mounted on one of the shafts 13 and with which the gear 30 engages by the movement of the lever 32' to drive the shaft 29 in the opposite direction from that in which it will be driven by the engagement with the gear 31. Chains 33 are attached to the shaft 26 and wound thereon and connected to the arms 16' so that when the shaft 29 is rendered operative, the shaft 26 will be revolved to wind up the chains thereon and raise the arms 16' and the rake frame or lower the said arms and drop the rake frame to a point near the bottom of the rack. The rake frame is tilted on its pivots by means of a crank arm 34 mounted on a shaft 34' on the upper portion of the rack and connected with the rake frame by a link 35 and with an operating lever 36 by means of a bar 37. This operating lever operates over a notched bar 38 and has a latch 39.

In Fig. 2 the rake frame is shown raised a considerable distance above the bottom of the rack and inclined at an angle with respect thereto. This position of the rake frame is determined by the elevation of the arms 16 whereon it is supported. When the rack is empty, the rake frame may be lowered to a point near the floor of the rack where it will engage the bundles or the loose material coming in over the pick-up fingers and will feed the bundles of material backwardly to the rear of the rack, thus preventing the forward portion from filling up and clogging while the rear portion remains unfilled. As the bundles accumulate in the rack, the rake may be elevated and if desired moved to a point nearer the rear of the rack, where it can operate on the top of the load and feed the bundles thereover until the rear portion of the rack is filled, the angular adjustment of the rake frame being determined by the adjustment of the lever 36. A shaft 40, having a series of pins 41, is provided near the rear end of the fingers 10, said fingers projecting through the bottom of the rack and preventing the bundles or loose hay or grain from sliding out when the rack is tilted to its receiving position. I regard these pins 41 as an important feature of my invention, as they will prevent the load accumulating in the rack as the machine moves along from sliding down toward the fingers and into the path of the revolving rake. Of course, in starting the machine the pins will be in their retracted position, but when a sufficient amount of material has accumulated in the rear of the pins they are thrust out by means of the mechanism to be described to engage the bundles or loose material and prevent them from sliding down upon the gathering fingers. (See Fig. 3.) This shaft is controlled by an operating cord 42 extending to a lever 43 which has connections on both sides of its pivot 44 with said cord. This lever 43 also has a connection 45 with an end board 46 which is pivoted at 47 in the rear end of the rack and adapted to close the same. When the device is used as a manure spreader, this end board is preferably swung down to the position indicated in Fig. 4, and the projecting pins are withdrawn to allow the feeder to discharge the manure from the bottom of the rack without obstruction.

For the purpose of tilting the rack, I provide a cable 48 attached at 49 to the rear portion of the rack and passing around antifriction rollers 50 and 51 on the frame 2 and around pulleys 52 on a transverse shaft 53 that is provided with an operating wheel 54. An end gate is adapted to close the open rear end of the rack and rest in seats 56 provided in brackets 57 on the rack frame. This end gate has vertical guides 58 thereon adapted to receive staples 59 mounted on the frame of the rack. When the rack descends, these staples will slide in the guides, allowing the end gate to remain stationary. Springs 60 on each side of the machine tend to hold the tilting rack in a horizontal position. These springs are capable of adjustment to regulate their tension and allow the gathering fingers to rest lightly upon the surface of the ground and adapt themselves to the inequalities thereof without danger of the ends of the fingers digging into the soil. I prefer to provide draft devices 61 on each side of the machine in front of the carrying wheels. These draft devices are preferably connected with one another around the forward portion of the machine by means of a cable 61'.

In the operation of the machine, the rack having been tilted so that the gathering fingers rest upon the ground in position to collect the bundles of grain, the rake frame will then be set at the desired angle with respect to the fingers and the bottom of the rack and the belts being put in motion, the fingers will engage the bundles and feed them backwardly into the rack, the angle of the rake frame being changed from time to time as occasion requires. In case the rake is desired for use as a feeder, as when the machine is used in spreading manure, the rack will be tilted backwardly, the end board 46 lowered to the position shown in Fig. 4, and the frame adjusted so that it will be parallel substantially with the bottom of the rack and at a suitable distance therefrom to feed the load out over the end board upon the ground, the angle of the frame being changed, of course, as the load is being discharged to accommodate the feeding fingers to the surface of the load.

It will be noted that the rake frame, by reason of its support on the oscillating arms, is capable of adjustment lengthwise of the rack to adapt it for the character of the material to be loaded, and the frame being capable of swinging on its pivots, can be adjusted at any desired angle with respect to the work.

In various ways the details of construction of this machine and the mechanism for driving the different parts may be modified without departing from the spirit of my invention, the essential feature being the rake frame and belts carried thereby, capable of angular adjustment with respect to the bottom of the rack, and the pins provided in the bottom of the rack to prevent the load from sliding down upon the gathering fingers during the loading operation.

I claim as my invention:

1. An apparatus of the class described comprising a rack having carrying wheels and a gathering mechanism, a rake arranged within said rack, crank arms journaled in said rack and pivotally connected with the middle portion of said rake and means for swinging said crank arms to raise and lower said rake bodily into the upper part of said rack or to a point near the floor thereof.

2. The combination, with a rack having carrying wheels and a gathering mechanism, of arms mounted on the side walls of said rack, a rake pivotally supported on said arms near its middle portion, means for swinging said arms on their pivots to raise or lower said rake bodily and move it lengthwise in said rack, said rake in its forward movement overhanging said gathering mechanism to direct the material into said rack and said rake when moved lengthwise to the rear end of said rack operating to feed the material from said rack out of the rear end thereof.

3. The combination, with a rack and a gathering mechanism, of arms pivoted in said rack, a rake pivoted near its middle portion on said arms, said rake having a combined lengthwise movement on the pivotal supports of said arms and a rotary movement on its own pivots above and below the pivots of said arms.

4. An apparatus of the class described comprising a rack having carrying wheels and a gathering mechanism, a rake frame pivotally supported within said rack, means for raising and lowering said frame bodily in said rack, said frame being capable of adjustment close to the bottom of said rack at an elevation above the supports of said rake frame in said rack, and means for tilting said frame.

5. An apparatus of the class described comprising a tilting rack having carrying wheels and pick-up fingers, shafts mounted on each side of said rack, arms secured thereon, a rake frame pivoted on said arms and having belts and rake fingers, means for raising and lowering said arms to change the vertical adjustment of said frame, said frame being vertically movable above and below the pivots of said arms.

6. The combination, with a rack having carrying wheels and a gathering means, of a rake supported within said rack and having a series of fingers operating to feed the material backwardly into said rack, and retarding pins provided near said pick-up fingers, said pins operating to prevent the load sliding forwardly upon said gathering means, for the purpose specified.

7. The combination, with a rack having carrying wheels and pick-up fingers, of a shaft mounted near the forward end of said rack, a series of pins mounted thereon, means for operating said crank shaft to project or withdraw said pins, and means operating above said pins to feed the material into said rack.

8. The combination, with a rack or receptacle having carrying wheels and gathering fingers, of a pivoted rake mounted within said rack and comprising a frame and moving fingers carried thereby, said frame being bodily adjustable about a fixed point and also having an independent tilting movement on its pivots above and below said fixed point, and means for operating said frame and fingers.

9. The combination, with a rack having carrying wheels and pick-up fingers, of a pivoted rake mounted within said rack and having movement around a fixed point and independent movement on its pivots, said rake normally overhanging said pick-up fingers, and a retarding means provided near said fingers beneath said rake.

10. The combination, with a rack having carrying wheels and gathering fingers at its forward end, of means for tilting said rack forwardly or backwardly to move said fingers to an operative or an inoperative position, said rack having an end board at its rear end, and means operating within said rack to feed the material gathered up by said fingers toward the rear portion of said rack and means for adjusting said feeding means to feed the material out of the rear end of said rack.

11. The combination, with a rack or receptacle having carrying wheels and gathering fingers at its forward end and having an open rear end through which the material therein may be discharged and a rake pivotally mounted within said rack and capable of adjustment into a position parallel substantially with the bottom of said rack, and means for operating said rake to feed the material through said open rear end.

12. The combination, with a rack having carrying wheels and gathering fingers at its forward end and an open rear end, of a rake arranged within said rack, pivoted arms whereon said rake is pivotally supported, said rake having an oscillating movement bodily with said arms.

13. The combination, with a rack or receptacle having carrying wheels and gathering fingers adapted to slide along the ground, of a frame, means yieldingly connecting said rack with said frame, said means being put under tension by the forward tilting of said rack to counter-balance the weight of the same and prevent said gathering fingers from digging into the ground.

14. The combination, with a rack having carrying wheels and gathering fingers, of a frame, coil springs connecting said rack with said frame on each side of the machine, said springs being put under tension by the forward tilting of said rack and operating to counter-balance the weight of the same and prevent said fingers from digging into the ground.

15. The combination, with a forwardly or backwardly tilting rack and a gathering mechanism therefor, of a rake, arms pivoted in said rack and whereon said rake is pivoted near its middle portion, said arms being capable of swinging to a substantially vertical position to allow said rake to be adjusted near the bottom of said rack and parallel substantially therewith, the oscillation of said arms operating to lift said rake away from the bottom of said rack while remaining substantially parallel therewith.

16. The combination, with a rack and a gathering mechanism, of a rake, arms pivoted in said rack and pivotally connected with the middle portion of said rake, means for swinging said arms to raise or lower said rake bodily, said rake tilting on its pivots on said arms to raise or lower either end of said rake and change its angle with respect to the bottom of said rack.

In witness whereof, I have hereunto set my hand this 10" day of March 1910.

HENRY HENDERSON.

Witnesses:
L. C. CRONEN,
G. E. SORENSEN.

Copies of this patent may be obtained for five cents each, by addressing the "Commissioner of Patents, Washington, D. C."